(12) United States Patent
Hino et al.

(10) Patent No.: US 6,575,215 B1
(45) Date of Patent: Jun. 10, 2003

(54) STUDLESS TIRE INCLUDING TREAD COMPRISING SHORT FIBERS

(75) Inventors: Hidehiko Hino, Kobe (JP); Hiroyuki Nakagawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/704,555

(22) Filed: Nov. 3, 2000

(30) Foreign Application Priority Data

Nov. 5, 1999 (JP) .......................................... 11-315859
Nov. 5, 1999 (JP) .......................................... 11-315860

(51) Int. Cl.$^7$ .......................... B60C 1/00; B60C 11/00; B60C 11/03
(52) U.S. Cl. ............................. 152/209.4; 152/209.5; 152/209.15; 152/209.18; 152/458; 152/DIG. 3
(58) Field of Search .............................. 152/209.4, 211, 152/212, 458, 209.5, 454, 209.18, DIG. 3, 209.14, 209.15

(56) References Cited

U.S. PATENT DOCUMENTS

| | | | |
|---|---|---|---|
| 1,037,311 A | * | 9/1912 | Pratt |
| 1,896,574 A | * | 2/1933 | Covey |
| 1,935,519 A | * | 11/1933 | Quinn |
| 2,670,777 A | * | 3/1954 | Wallace |
| 3,856,067 A | * | 12/1974 | Gorter |
| 4,215,734 A | * | 8/1980 | Suzuki et al. |
| 4,700,762 A | | 10/1987 | Landers |
| 5,591,279 A | | 1/1997 | Midorikawa et al. |
| 5,702,546 A | * | 12/1997 | Itoh et al. |
| 6,250,354 B1 | * | 6/2001 | Kawai |
| 6,374,885 B1 | * | 4/2002 | Uchida et al. |
| 2001/0004911 A1 | * | 6/2001 | Iwamura |

FOREIGN PATENT DOCUMENTS

| | | |
|---|---|---|
| CA | 955023 | 9/1974 |
| CA | 2049784 | * 3/1992 |
| FR | 2630374 | 10/1989 |
| JP | 62-191204 | * 8/1987 |
| JP | 2-274602 | * 11/1990 |
| JP | 3-258603 | * 11/1991 |
| JP | 7-257111 | * 10/1995 |
| JP | 09323507 | 12/1997 |
| JP | 10129214 | 5/1998 |
| JP | 10-129214 | * 5/1998 |
| JP | 11-245631 | * 9/1999 |

OTHER PUBLICATIONS

XP–002181869, abstract for Japan 7–257111 published Oct. 9, 1995.

* cited by examiner

*Primary Examiner*—Steven D. Maki
(74) *Attorney, Agent, or Firm*—Birch, Stewart, Kolasch & Birch, LLP

(57) ABSTRACT

A studless tire comprises a tread defining a ground-contacting region, the tread comprising at least a diene rubber and non-metallic short fibers oriented in the tire radial direction. The tire profile satisfies the following equation $$1 > TW/S > 0.92 - 0.17 \times A$$

wherein TW is the ground-contacting width of the tire; S is the section width of the tire; and A is the tire aspect ratio. In the ground-contacting region, at least one circumferential rib of which total axial width is 15 to 30% of the ground-contacting width TW may be disposed. The ground-contacting face of the tread may be provided on at least 80% of its area with unevenness molded by a tire vulcanizing mold so as to have a ten-point mean roughness of from 30 to 500 micrometers.

11 Claims, 7 Drawing Sheets

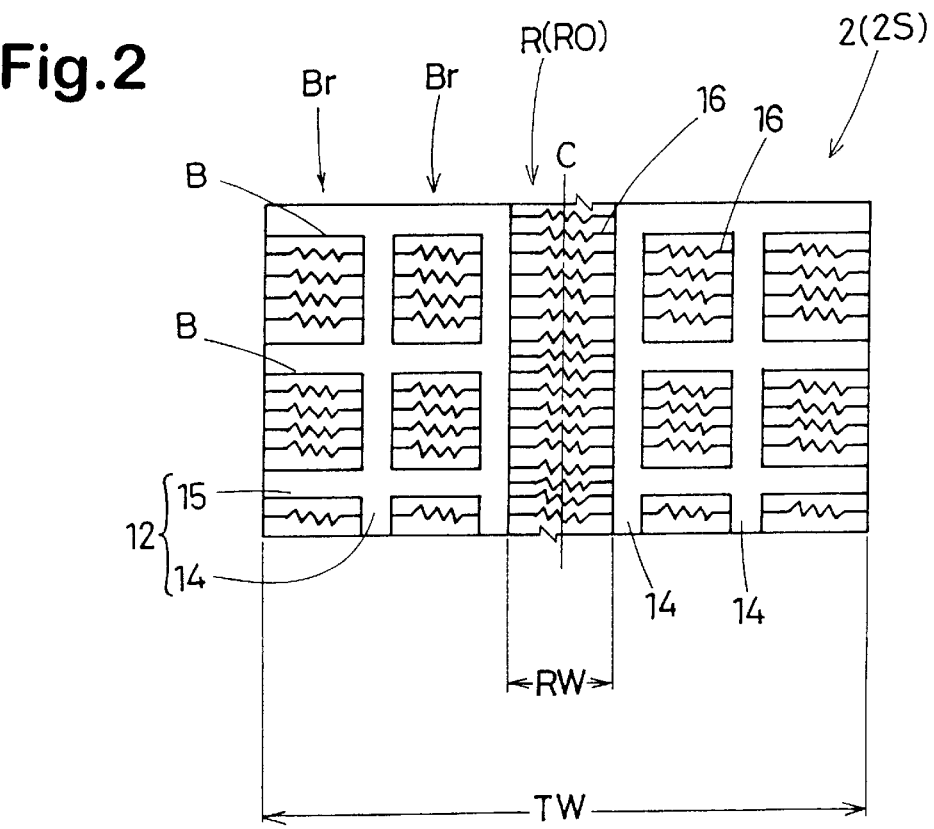
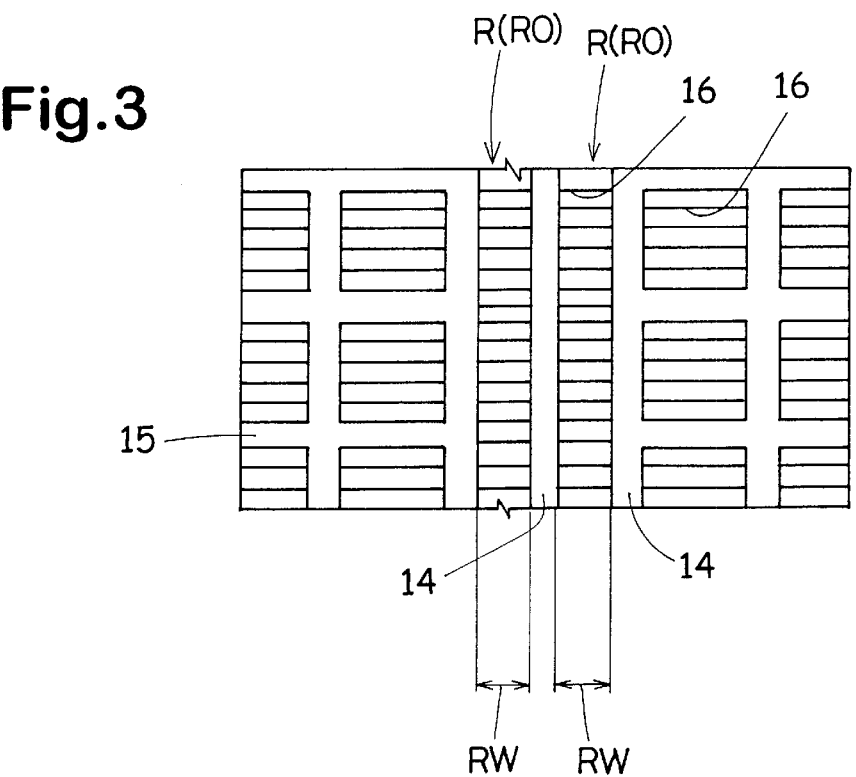

STUDLESS TIRE INCLUDING TREAD COMPRISING SHORT FIBERS

The present invention relates to a pneumatic tire, more particularly to a studless tire of which tread rubber comprises short fibers to improve on-the-ice performance.

Studless tires are, in order to improve on-the-snow performance and on-the-ice performance, conventionally provided with blocks and sipes in the tread portion and soft tread rubber is used. In recent years, inventions on tread rubber which includes fibrous substances functioning as spikes have been made.

In Japanese patent application No.11-212129 filed on Jul. 27, 1999, a studless tire of which tread rubber comprises non-metallic short fibers such as glass fibers or carbon fibers oriented in the thickness direction of the tread rubber was proposed, wherein the short fibers have an average length of 0.1 to 5 mm and an average diameter of 1 to 100 micrometers. And the ratio E1/E2 of the tread rubber, which is defined as the ratio of the complex modulus E1 in the thickness direction to the complex modulus E2 in the tire circumferential direction, is set in the range of from 1.1 to 4 under a temperature of 25 deg.C., frequency of 10 Hz, initial strain of 10%, and dynamic strain of 1%. Further, at a temperature of −10 deg.C., the tread rubber has a hardness of from 45 to 75. Therefore, due to the adhesive friction, cohesive friction and scratching friction, the frictional force (grip) between the tire tread surface and ice-covered road surface can be effectively improved, and the wear resistance of the tread is also improved.

We handed over duties to develop this invention studied in order to further improve on-the-ice performance especially that of passenger car tires, and it was discovered that such a tread rubber displays its full power when combined with a specific tire profile and/or tread pattern. Further, it was discovered that when the tire is vulcanized in a mold as usual, the short fibers' orientation is liable to disturbed in the neighborhood of the ground-contacting surface, and the short fibers are, against expectation, oriented in random directions which are almost parallel with the ground-contacting surface, which therefore, nullify the effects of the short fibers.

It is therefore, an object of the present invention to provide a studless tire which is based on Japanese patent application No.11-212129 but further improved in on-the-ice performance.

SUMMARY OF THE INVENTION

According to one aspect of the present invention, a studless tire comprises a tread rubber defining a ground-contacting region, the tread rubber comprising at least a diene rubber and non-metallic short fibers oriented in the tire radial direction, wherein a tire profile satisfies the following equation $$1 > TW/S > 0.92 - 0.17 \times A$$

wherein

TW is a ground-contacting width of the tire,

S is a section width of the tire, and

A is an aspect ratio of the tire.

In the ground-contacting region, at least one circumferential rib of which total axial width is 15 to 30% of the ground-contacting width may be disposed. Preferably, the ground-contacting face is provided on at least 80% of its area with unevenness which is molded by a tire mold to have a ten-point mean roughness of from 30 to 500 micrometers.

BRIEF DESCRIPTION OF THE DRAWINGS

Embodiments of the present invention will now be described in detail in conjunction with the accompanying drawings.

FIG. 2 is a plan view thereof showing an example of the tread pattern.

FIGS. 3, 4 and 5 are plan views each showing another example of the tread pattern.

DETAILED DESCRIPTION

Figure 1:
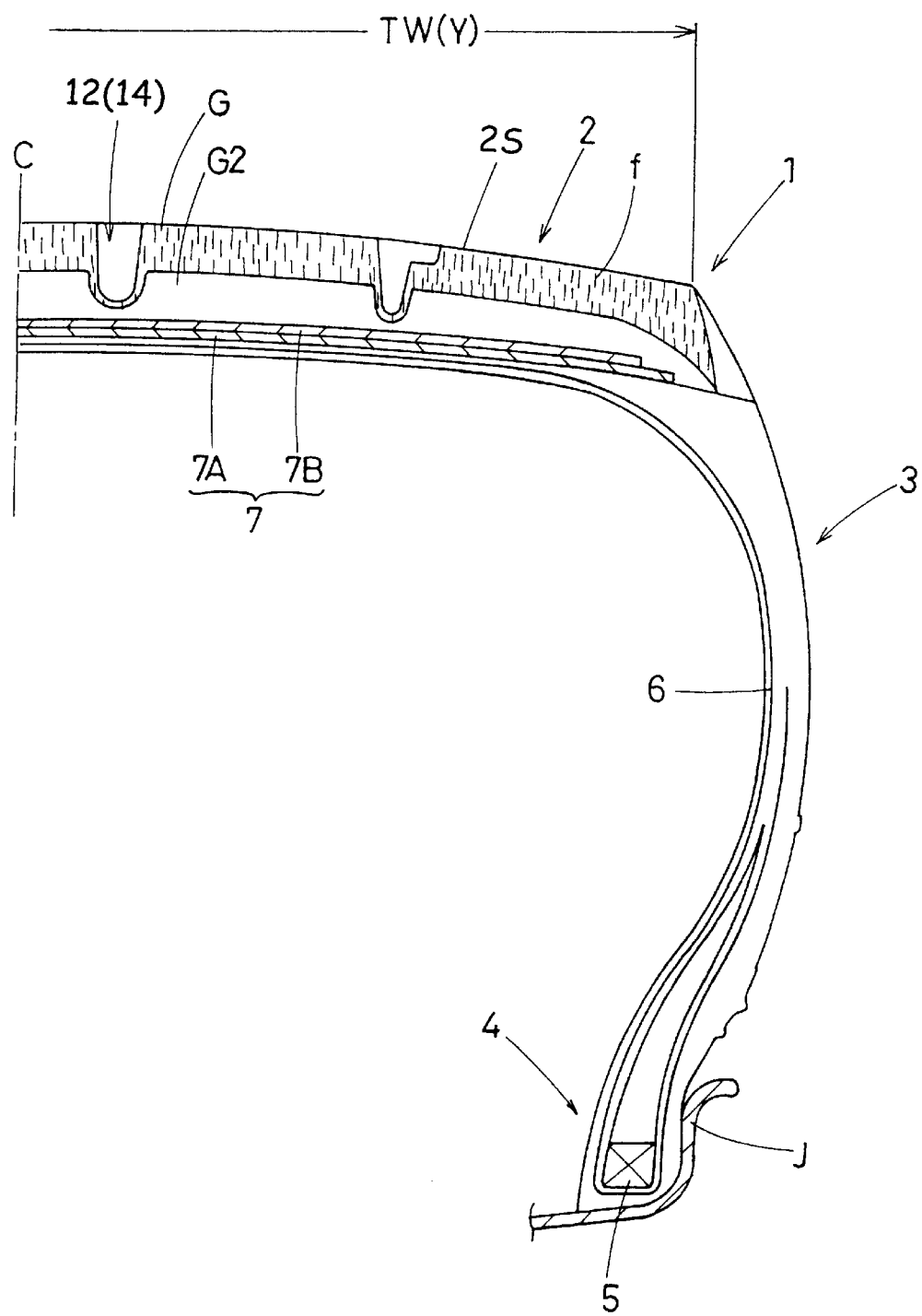
FIG. 1 is a cross sectional view of a studless tire according to the present invention.

In the drawings, studless tire 1 according to the present invention comprises a tread portion 2, a pair of sidewall portions 3, a pair of bead portions 4, a carcass 6 extending between the bead portions 4, and a belt 7 disposed radially outside the carcass 6.

In this embodiment, the tire 1 is a radial tire for passenger cars. FIG. 1 shows a meridian section of the tire which is mounted on a standard wheel rim J and inflated to a standard pressure but loaded with no tire load. (hereinafter the "normal inflated unloaded condition")

Here, the standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In the case of passenger car tires, however, 180 kPa is used as the standard pressure. The undermentioned standard load is the "maximum load capacity" in JATMA, 70% of the "Load Capacity" in ETRTO, the maximum value given in the above-mentioned table in T&RA or the like. In the case of passenger car tires, however, 88% of such value is used as the standard load.

The carcass 6 comprises at least one ply of cords arranged at an angle of 75 to 90 degrees with respect to the tire equator C and extending between the bead portions 4 through the tread portion 2 and sidewall portions 3 and turned up around a bead core 5 in each of the bead portions 4. For the carcass cords, organic fiber cords, e.g. aromatic polyamide, nylon, rayon, polyester and the like, and steel cords can be used. In this example the carcass is composed of a single ply of polyester fiber cords arranged radially at 90 degrees with respect to the tire equator.

The belt 7 comprises two cross plies of parallel cords laid at an angle of from 10 to 35 degrees with respect to the tire equator C. In this example, the belt 7 is composed of a radially inner wider ply 7A and a radially outer ply 7B, both made of steel cords.

On the radially outside of the belt 7, a rubber tread G is disposed defining a ground-contacting face 2S of the tire.

The tread G is made of at least one diene rubber (elastomer) selected from natural rubber, isoprene rubber, styrene butadiene rubber, butadiene rubber, chloroprene rubber, acrylonitrile butadiene rubber and the like and including short fibers (f) oriented in the thickness direction of the tread G (tire radial direction).

For the short fibers, non-metallic fibers, preferably non-metallic inorganic fibers are used to minimize difference in wear between the short fibers and tread rubber in use and minimize damage to the road surface. Especially, glass fibers or carbon fibers are preferably used because these materials are easily broken into appropriate lengths during kneading the tread rubber and thus they are dispersed and oriented equally.

The average diameter of the short fibers is set in the range of from 1 to 100 micrometers, preferably 3 to 50 micrometers. The average length of the short fibers is set in the range of from 0.1 to 5.0 mm, preferably 0.1 to 3.0 mm.

With respect to 100 parts by weight of the diene rubber, the tread rubber comprises 2 to 28 preferably 3 to 20 parts by weight of the short fibers.

At a temperature of −10 deg.C., the tread rubber has a hardness (measured with a durometer type-A according to JIS-K6253) in the range of from 45 to 75, more preferably 45 to 60.

At a temperature of 25 deg.C., the tread rubber has a modulus ratio E1/E2 in the range of from 1.1 to 4.0, preferably 1.2 to 3.5, wherein E1 is the complex elastic modulus in the tire radial direction, and E2 is the complex elastic modulus in the tire circumferential direction, each measured with a viscoelastic spectrometer under the following conditions: a frequency of 10 Hz, an initial strain of 10%, and a dynamic strain of 1%, using a specimen of 5×4×1 mm size cut out from the tread portion 2.

In FIG. 1, the tread portion 2 further comprises an under tread G2 disposed between the tread G and the belt 7. The under tread G2 is made of rubber without the short fibers.

The tread portion 2 is provided with tread grooves 12 to form blocks B and at least one circumferential rib R.

As to the widths and depths of the tread grooves 12, the groove widths are set in a range of from 3 to 25 mm and the groove depths are set in a range of from 8 to 15 mm in case of a passenger car tire, for example.

In the present invention, the rib R means a rib R0 which is substantially continuous (FIGS. 2 and 3) and a rib-like element R1 (FIGS. 4 and 5) of which the net ground-contacting area Lr is at least 85% of the gross area Sr including the grooved area. If the net ground-contacting area Lr is less than 85%, it is treated as a row of blocks.

It is preferable that the rib/ribs R is/are disposed in a tread center region than in a tread edge region because the ground pressure is relatively high in the tread center region.

Figure 5:
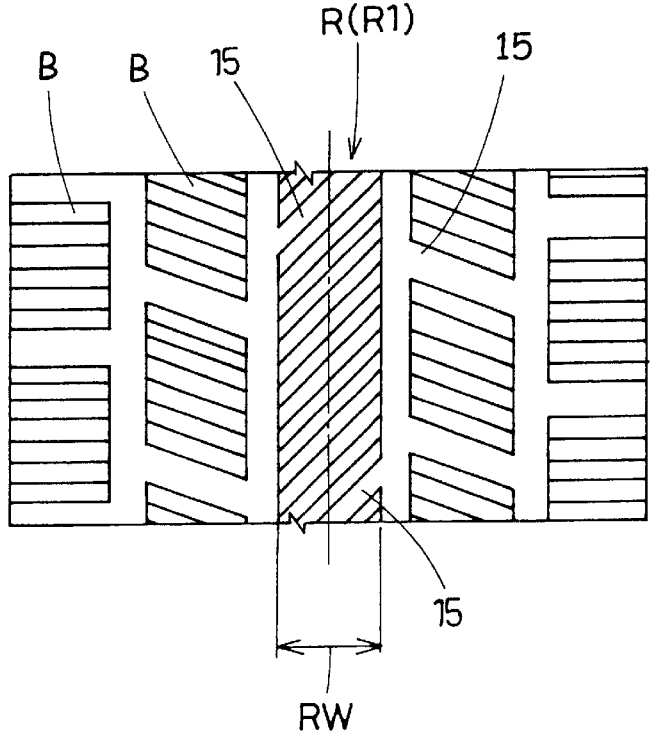

Each rib R is provided with sipes 16. Usually, the blocks B are also provided with sipes 16. Here, the sipe 16 is a cut or a narrow slit having a width less than 1 mm. It is preferable that the sipes 16 generally extend in the tire axial direction. But, it is also possible to incline sipes as shown in FIG.5.

It is preferable that the total axial width of a single rib R or a plurality of ribs R is in the range of from 15 to 30% of the tread-contacting TW. If the total axial width is less than 15%, the tread pattern rigidity is decreased by the sipes 16 and becomes insufficient for maintaining the necessary ground-contact. If the total axial width is more than 30%, on-the-snow performance such as snow grip is deteriorated.

FIGS. 2, 3, 4 and 5 show preferred examples of the tread patter.

In FIG. 2, the tread grooves 12 include four straight circumferential grooves 14 and straight axial grooves 15. The tread portion 2 is divided into a straight rib R(R0) disposed on the tire equator C, and two circumferential rows Br of rectangular blocks B disposed on each side of the rib.

In FIG.3, the tread grooves 12 include five straight circumferential grooves 14 and straight axial grooves 15. The tread portion 2 is divided into two straight ribs R(R0) disposed one on each side of the central circumferential groove 14 on the tire equator C, and two circumferential rows Br of rectangular blocks B disposed on the axially outside of each of the ribs.

Figure 4:
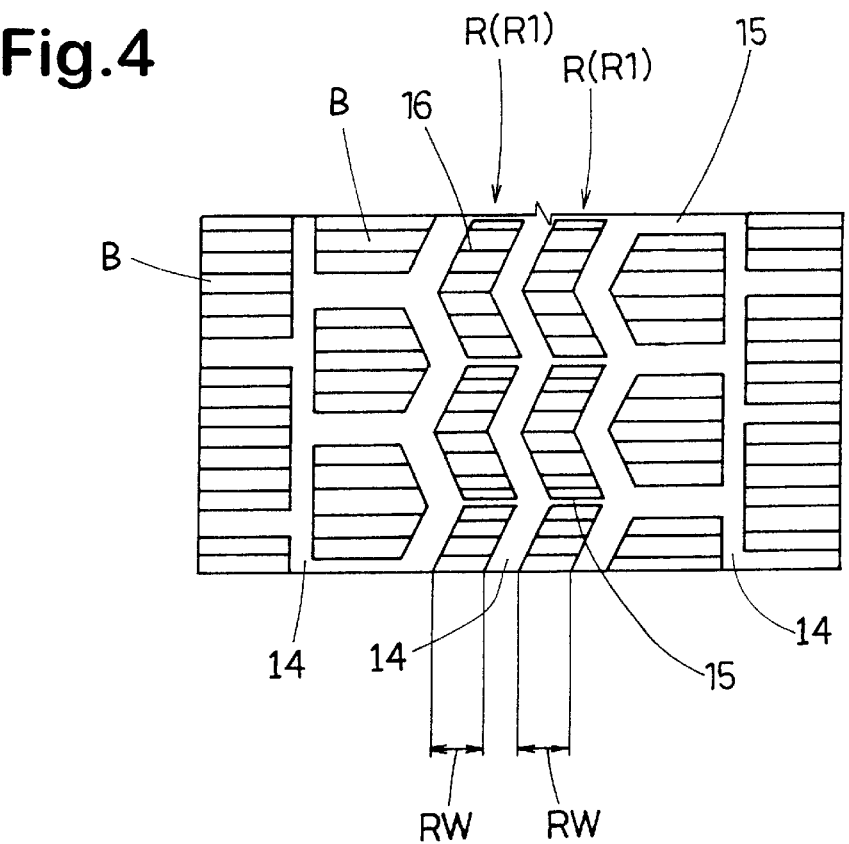

In FIG.4, the tread grooves 12 include two straight circumferential grooves 14 and three zigzag circumferential grooves 14 therebetween and straight axial grooves 15. The tread portion 2 is divided into two zigzag ribs R(R1) one on each side of the central zigzag circumferential groove 14, and axially inner circumferential rows Br of pentagonal blocks B and axially outer circumferential rows Br of rectangular blocks B.

In FIG.5, the tread grooves 12 include four straight circumferential grooves 14 and straight axial grooves 15. The tread portion 2 is divided into a straight rib R(R1) disposed on the tire equator C, and axially inner circumferential rows Br of parallelogonal blocks B and axially outer circumferential rows Br of rectangular blocks B. The axial grooves in both the axially inner rows are inclined in one direction. The axial grooves in the central rib R(R1) are inclined in one direction which is reverse to that in the axially inner rows.

In the rib-like elements R1, to maintain its rigidity, the space between the axial grooves 15 is set to be larger than the axial width RW of the rib-like element R1.

According to the present invention, the ratio TW/S of the ground-contacting width TW to the tire section width S satisfy the following equation (1)

$$1 > TW/S > 0.92 - 0.17 \times A$$

wherein

"A" is the aspect ratio of the tire, that is, the ratio of the tire section height to the tire section width S under the normal inflated unloaded condition. The tire section width S is the maximum width of the tire under the normal inflated unloaded condition. The ground-contacting width TW is the axial distance between the axial outermost edges of the ground-contacting region Y of the tread portion 2 when the tire is mounted on the standard wheel rim and inflated to the standard pressure and loaded with the standard load (hereinafter, the "standard loaded condition").

Figure 6:
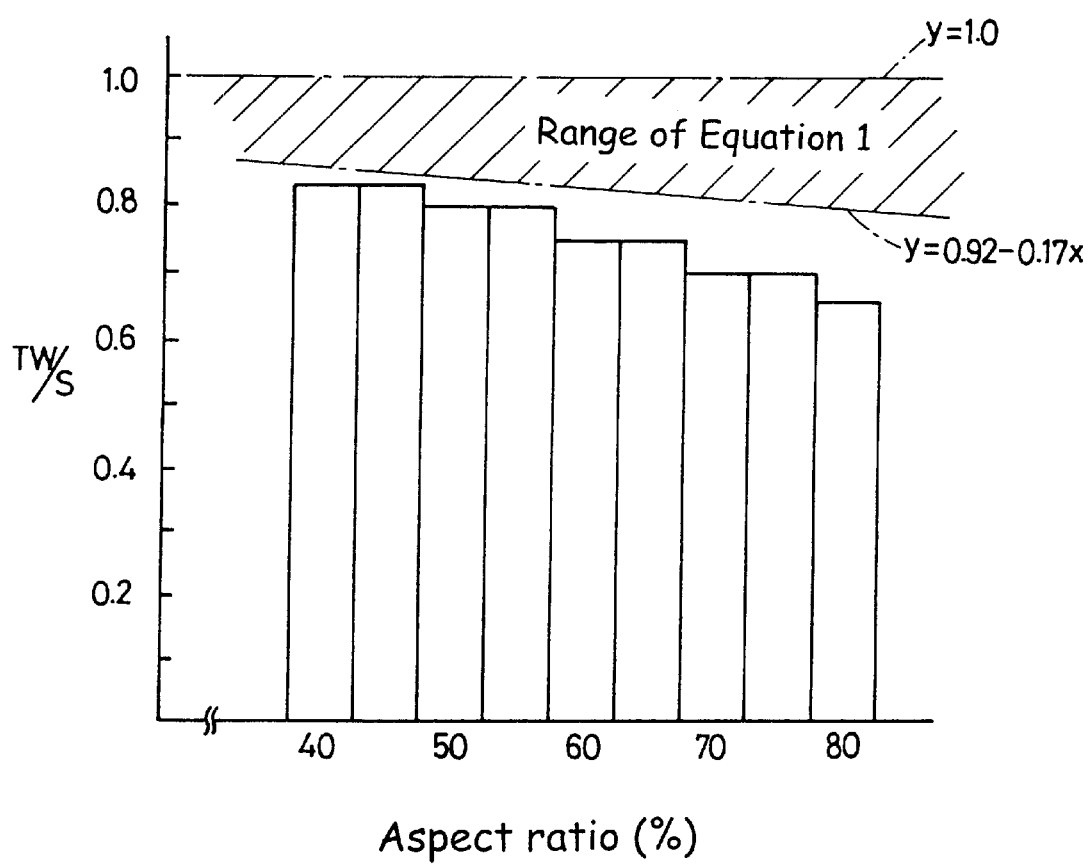
FIG. 6 is a graph showing TW/S ratio and aspect ratio A of tires on the market and tires of the invention.

FIG. 6 shows the TW/S ratio and aspect ratio A of tires on the market. As understood from this figure, the range defined by the above-mentioned equation (1) lies above the existing tires. By satisfying this range, on-the-ice performance and steering stability can be improved.

Further, the land ratio Ls/Ss is preferably set in the range of from 60 to 72%, wherein Ls is the net ground-contacting area of the ground-contacting region Y, and Ss is the gross area of the ground-contacting region Y including the grooved area. If Ls/Ss is less than 60%, on-the-ice performance can not be improved. If Ls/Ss is more than 72%, on-the-snow performance such as snow grip deteriorates.

On-the-ice Performance Test 1:

Studless tires of size 195/65R15 (Rim size 15×6JJ) having the structure shown in FIG. 1 and specifications shown in Table 1 were made and tested for ice performance as follows.

A 2000cc FR passenger car provided on all the four wheels with test tires inflated to 200 kpa was run on an ice-covered test course at a speed of 30 km/hr, and a wheel-lock brake was applied to all the wheels to measure the braking distance. In Table 1, the reciprocal of the braking distance is indicated by an index based on Ref.1 as being 100. The larger the index, the better the performance.

The tread rubber composition used in the test tires is shown in Table 2. The tires were tested after running-in for 200 km.

calender rolls CR. Between the calender rolls CR, the short fibers (f) are oriented in the calendering direction. The seat RS is fold like accordion pleats. As a result, a raw tread rubber strip TS in which the short fibers (f) are oriented in the thickness direction can be made.

Figure 8A:
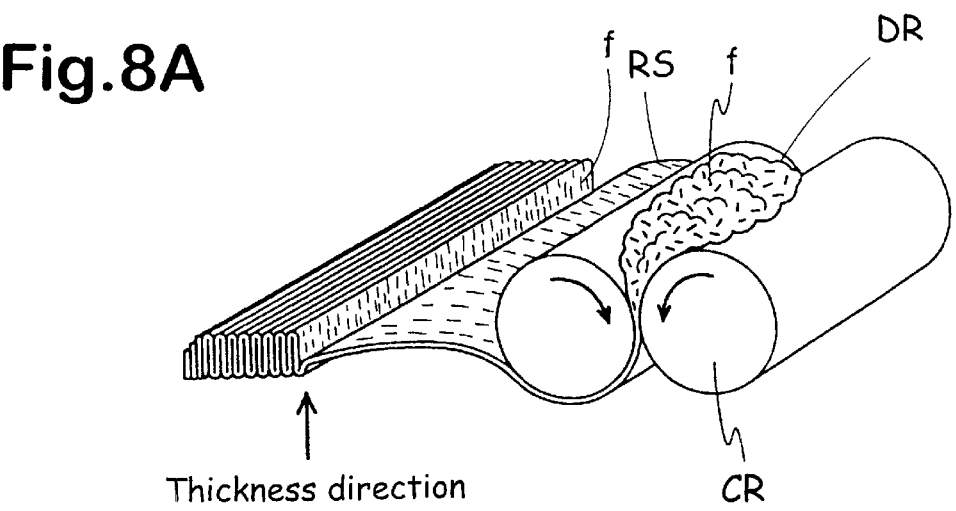
FIG. 8A is a diagram for explaining a method of making the tread rubber strip.
Figure 8B:
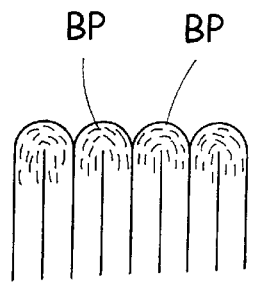
FIG. 8B is an enlarged cross sectional view of the resultant tread rubber strip.

In this method, however, as shown in FIG. 8B, it is inevitable that the short fibers (f) in the bent portions BP are oriented in directions other than the thickness direction. Thus, it is desirable that such portions are removed before use.

Figure 9:
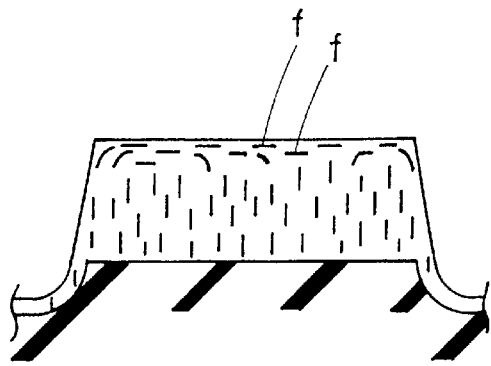
FIG. 9 is a cross sectional view for explaining a problem in orienting the short fibers in the neighborhood of the ground-contacting surface.

On the other hand, during vulcanizing the tire in a mold, as the tread rubber is compressed and flows, the short fibers in the neighborhood of the ground-contacting surface are fallen or collapsed as shown in FIG. 9.

Therefore, even if the short fibers in the raw tread rubber strip TS are completely oriented in the thickness direction, it is difficult to prevent the short fibers from being oriented in incorrect directions in the vulcanized tire. Thus, it is

TABLE 1

| Tire | Ref. 1 | Ex. 1 | Ex. 2 | Ex. 3 | Ref. 2 |
|---|---|---|---|---|---|
| Short fibers | | | | | |
| Material | glass | glass | glass | glass | carbon |
| Ave. diameter (micrometer) | 11 | 11 | 11 | 11 | 11 |
| Ave. length (mm) | 0.5 | 0.5 | 0.5 | 0.5 | 0.5 |
| Content *1 | 5 | 5 | 5 | 5 | 5 |
| Tread rubber | | | | | |
| Hardness @ −10 deg. C. | 61 | 61 | 61 | 61 | 61 |
| E1/E2 | 1.42 | 1.42 | 1.42 | 1.42 | 1.42 |
| E1 (kgf/sq. cm) | 6.1 | 6.1 | 6.1 | 6.1 | 6.1 |
| E2 (kgf/sq. cm) | 4.3 | 4.3 | 4.3 | 4.3 | 4.3 |
| Ground-contacting width TW (mm) | 152 | 166 | 166 | 170 | 152 |
| Tire section width S (mm) | 195 | 195 | 195 | 195 | 195 |
| Tire aspect ratio A | 0.65 | 0.65 | 0.65 | 0.65 | 0.65 |
| Outside or inside Eq. 1 range | out | in | in | in | out |
| Ls/Ss (%) | 66 | 66 | 66 | 66 | 66 |
| Total rib width RW (mm) | 0 | 0 | 36 | 36.9 | 33 |
| RW/TW (%) | 0 | 0 | 21.6 | 21.7 | 21.7 |
| On-the-ice performance Braking distance (index) | 100 | 116 | 120 | 124 | 103 |

*1 in parts by weight with respect to 100 parts by weight of the elastomers.

TABLE 2

(parts by weight)
Tread rubber composition

| Elastomers | |
|---|---|
| natural rubber | 60 |
| high-cis polybutadiene | 40 |
| Additives | |
| carbon black | 45 |
| silica | 20 |
| paraffin oil | 20 |
| wax | 2 |
| age resistor | 1.5 |
| stearic acid | 2 |
| hydrozincite | 3 |
| silane coupling agent | 1.2 |
| sulfur | 1.5 |
| vulcanization accelerator | 1 |

Figure 7:
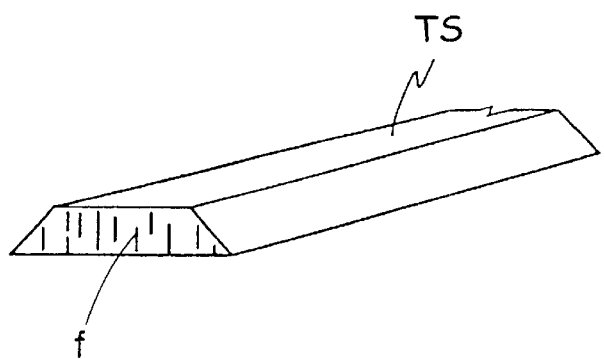
FIG. 7 is a schematic perspective view showing a tread rubber strip.

FIG. 7 shows a raw tread rubber strip TS which is not yet wound around the tire.

FIG. 8A shows a method of manufacturing such a raw tread rubber strip TS, wherein the diene rubber DR and short fibers (f) are kneaded and formed into a thin seat RS by required to shave the tread surface of the vulcanized tire to derive good on-the-ice performance from the beginning.

Figure 10:
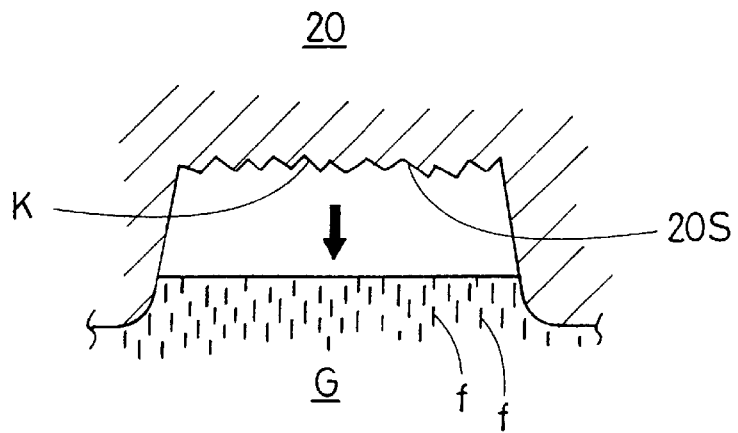
FIGS. 10 and 11 are cross sectional views for explaining a method of re-orienting the short fibers in the neighborhood of the ground-contacting surface.
Figure 11:
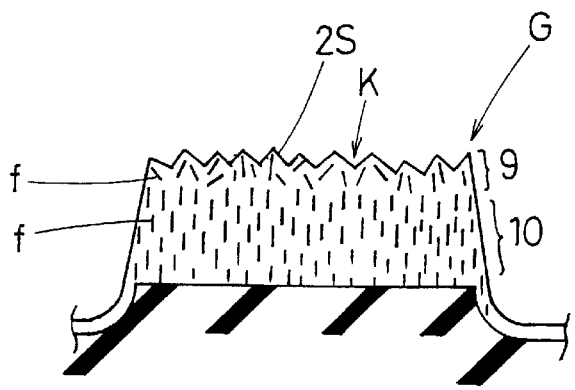

FIG. 10 shows a method which is effective for re-orienting the incorrectly oriented short fibers (FIG. 8B) and preventing the short fibers from being oriented in incorrect directions (FIG. 9). The vulcanization mold 20 for the tire is provided various profiled faces for shaping various portions of the tire, which include a face for shaping the ground-contacting face 2S of the tread (hereinafter the "tread shaping face 20S"). According to this method, at least 80% preferably 100% of the tread shaping face 20S is provided with unevenness K. The unevenness K can be formed by means of etching, sand blast and the like for example.

The uneven tread shaping face 20S has a ten-point mean roughness (Rz) in the range of from 30 to 500 micrometers.

First, owing to the unevenness K, the rubber flow along the face 20S is controlled. Second, when the tread rubber is compressed, the short fibers are forced to lie along the micro-surfaces of the unevenness K. Third, when the tread rubber is partially moved, the short fibers especially the ends thereof are caught in the unevenness K. Accordingly, falling down motions of the short fibers (f) can be controlled. It may be difficult to orient the short fibers completely in the radial direction, but the short fibers are effectively prevented from falling down in random directions parallel with the road surface. Therefore, it becomes possible to omit the above-mentioned tread surface shaving operation and bent portion removing operation. As a result, not only the production efficiency but also on-the-ice performance can be effectively improved.

The resultant ground-contacting face 2S of the vulcanized tire 1 has unevenness K of which ten-point mean roughness (Rz) in the range of from 30 to 500 micrometers.

As explained above, preferably at least 80%, ideally 100% of the ground-contacting face 2S is formed as uneven face.

Figure 12:
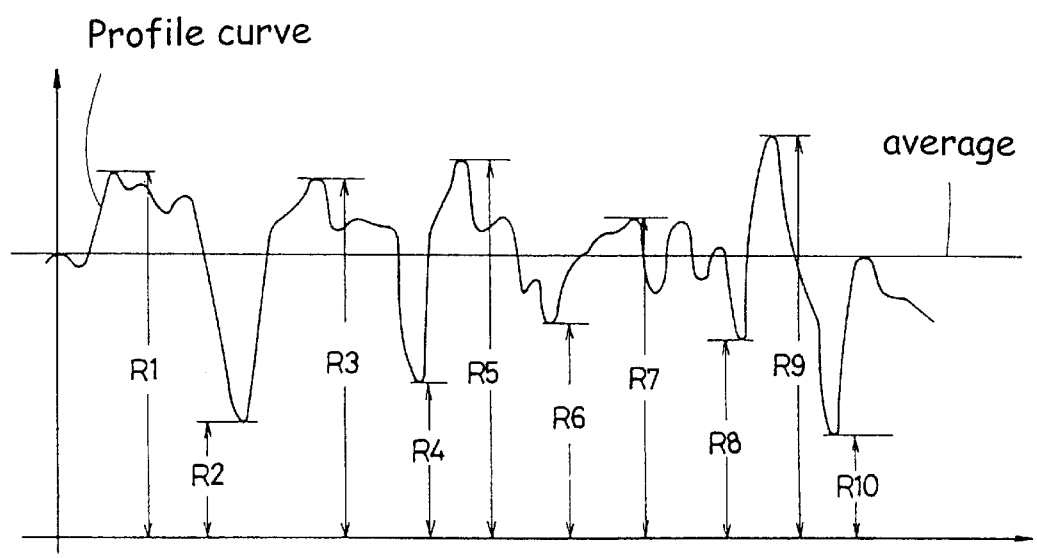
FIG. 12 is a profile curve of a surface for explaining the definition of ten-point mean roughness of the surface.

The above-mentioned ten-point mean roughness (Rz) is determined, according to Japanese Industry Standard B0601, as a difference between the average of heights at the first to fifth highest peak points, and the average of heights at the first to fifth deepest dip points in a part of a unit length extracted from the profile curve. As shown in FIG. 12, in a unit length of the profile curve, when the heights at the five peak points are R1, R3, R5, R7, R9 and the heights at the five dip points are R2, R4, R6, R8, R10, the ten-point mean roughness can be obtained by the following equation:

$$Rz = \{(R1+R3+R5+R7+R9)/5\} - \{(R2+R4+R6+R8+R10)/5\}$$

Each height is measured in the direction of magnitude from a line drawn in parallel with the average line not to intersect the profile curve.

If the ten-point mean roughness (Rz) is less than 30 micrometers, it is difficult to orient the short fibers (f) radially of the tire. If the ten-point mean roughness (Rz) is more than 500 micrometers, it is difficult to improve the ice performance.

If the average length of the short fibers is more than 2.0 mm, it becomes difficult for the above-mentioned unevenness K to prevent the short fibers from falling down. Accordingly, when the uneven face is provided, the average length of the short fibers (f) should be set in the range of from 0.1 to 2.0 mm. Further, the total axial width of a single rib R or a plurality of ribs R is preferably set in the range of from 15 to 25% of the ground-contacting TW.

On-the-ice Performance Test 2:

Studless tires of size 195/65R15 (rim size 15×6JJ) having the structure shown in FIG. 1 and specifications shown in Tables 3 and 4 were made and tested for on-the-ice performance as follows.

A 2000cc FR passenger car provided on all the four wheels with test tires (pressure 200 kpa) was run on an ice-covered test course at a speed of 15 km/hr, and a wheel-lock brake was applied to all the wheels to measure the braking distance. Then, the coefficient of friction is calculated from the braking distance. In Tables 3 and 4, the coefficient of friction is indicated by an index based on Ref.1 as being 100. The larger the index, the better the ice performance.

In the tires in Table 3, the uneven face was not provided deliberately. Thus, the ten-point mean roughness was about 10 to 30 micrometers. The tires were tested after running-in for 200 km.

In the tires in Table 4, the uneven face was provided on 100% of the ground-contacting face, and the tires were tested after running-in for 30 km.

The same tread rubber composition shown in Table 2 was used in all the test tires.

TABLE 3

| Tire | Ref. 1 | Ref. 2 | Ref. 3 | Ex. 1 | Ex. 2 | Ref. 4 |
|---|---|---|---|---|---|---|
| Tread pattern | FIG. 5 | FIG. 5 | FIG. 5 | FIG. 5 | FIG. 5 | FIG. 5 |
| Tread rubber | | | | | | |
| Hardness @ −10 deg. C. | 59 | 60 | 60 | 61 | 62 | 66 |
| E1/E2 | 0.96 | 1.05 | 0.72 | 1.42 | 1.46 | 4.15 |
| E1 (kgf/sq. cm) | 4.3 | 4.6 | 4.3 | 6.1 | 6 | 16.6 |
| E2 (kgf/sq. cm) | 4.5 | 4.4 | 6 | 4.3 | 4.1 | 4 |
| Short fiber | | | | | | |
| Content *1 | 0 | 0 | 5 | 5 | 5 | 30 |
| Material | | | glass | glass | carbon | glass |
| Orientation *2 | | | C | R | R | R |
| Ave. diameter (micron) | | | 11 | 11 | 14.5 | 11 |
| Ave. length (mm) | | | 0.5 | 0.5 | 0.5 | 0.5 |
| On-the-ice performance Friction coefficient | 100 | 100 | 105 | 125 | 126 | 95 |

*1 in parts by weight with respect to 100 parts by weight of the elastomers.
*2 C: circumferential direction, R: Radial direction

TABLE 4

| Tire | Ex. 10 | Ex. 11 | Ex. 12 | Ex. 13 | Ref. 10 | Ref. 11 | Ref. 12 |
|---|---|---|---|---|---|---|---|
| Tread pattern | FIG. 5 | FIG. 5 | FIG. 5 | FIG. 5 | FIG. 5 | FIG. 5 | FIG. 5 |
| Tread rubber | | | | | | | |
| Hardness @ −10 deg. C. | 61 | 61 | 61 | 61 | 61 | 61 | 61 |
| E1/E2 | 1.42 | 1.42 | 1.42 | 1.42 | 1.42 | 1.42 | 1.42 |
| E1 (kgf/sq. cm) | 6.1 | 6.1 | 6.1 | 6.1 | 6.1 | 6.1 | 6.1 |
| E2 (kgf/sq. cm) | 4.3 | 4.3 | 4.3 | 4.3 | 4.3 | 4.3 | 4.3 |
| Short fiber | | | | | | | |
| Content *1 | 5 | 5 | 5 | 5 | 5 | 5 | 5 |

TABLE 4-continued

| Tire | Ex. 10 | Ex. 11 | Ex. 12 | Ex. 13 | Ref. 10 | Ref. 11 | Ref. 12 |
|---|---|---|---|---|---|---|---|
| Tread pattern | FIG. 5 | FIG. 5 | FIG. 5 | FIG. 5 | FIG. 5 | FIG. 5 | FIG. 5 |
| Material | glass | glass | glass | glass | glass | glass | glass |
| Orientation *2 | R | R | R | R | R | R | R |
| Ave. diameter (micron) | 11 | 11 | 11 | 11 | 11 | 11 | 11 |
| Ave. length (mm) | 0.5 | 0.5 | 0.5 | 0.5 | 0.5 | 0.5 | 0.5 |
| Ten-point mean roughness (micron) | 30–50 | 51–100 | 101–200 | 201–500 | 5–10 | 11–25 | 501–800 |
| On-the-ice performance Friction coefficient | 110 | 110 | 113 | 108 | 100 | 100 | 101 |

What is claimed is:

1. A studless tire comprising:

a rubber tread defining a ground-contacting region, a tire profile satisfying the following equation $$1 > TW/S > 0.92 - 0.17 \times A$$

wherein

TW is a ground-contacting width of the tire,

S is a section width of the tire, and

A is an aspect ratio of the tire, the rubber tread comprising at least a diene rubber and non-metallic short fibers oriented in a tire radial direction so that the rubber tread has a modulus ratio E1/E2 in a range of from 1.2 to 3.5, wherein E1 is a complex elastic modulus in the tire radial direction, and E2 is a complex elastic modulus in a tire circumferential direction, each measured at a temperature of 25° C. and a frequency of 10 Hz, the rubber tread having a hardness in a range of from 45 to 60 when measured according to Japanese Industrial Standard K6253 at a temperature of −10° C., and the rubber tread provided in at least 80% area of a ground-contacting region with unevenness, wherein the unevenness is molded by a tire vulcanizing mold having unevenness, which has a ten-point mean roughness of from 30 to 500 micrometers, for orienting the adjacent short fibers towards directions not parallel with a ground-contacting surface.

2. The studless tire according to claim 1, wherein the net ground-contacting area Ls of the ground-contacting region is in a range of from 60 to 72% of the gross area Ss of the ground-contacting region.

3. The studless tire according to claim 2, wherein at least one circumferential rib is disposed in the ground-contacting region, and the total axial width of said at least one circumferential rib is in a range of from 15 to 30% of the ground-contacting width TW.

4. The studless tire according to claim 1, wherein at least one circumferential rib is disposed in the ground-contacting region, and the total axial width of said at least one circumferential rib is in a range of from 15 to 30% of the ground-contacting width TW.

5. The studless tire according to claim 1, wherein the non-metallic short fibers have an average diameter of from 1 to 100 micrometers, and an average length of from 0.1 to 2.0 mm.

6. The studless tire according to claim 1, wherein between the rubber tread and a tread reinforcing belt disposed radially inside thereof, an under tread made of rubber without short fiber is disposed.

7. The studless tire according to claim 6, wherein the tread reinforcing belt comprises two cross plies of steel cords.

8. The studless tire according to claim 1, wherein the rubber tread is divided into a circumferentially extending central rib and two circumferential rows of blocks on each side of the central rib, and the rib and blocks are provided with sipes.

9. The studless tire according to claim 1, wherein the diene rubber is at least one selected from the group consisting of natural rubber, isoprene rubber, styrene butadiene rubber, butadiene rubber, chloroprene rubber and acrylonitrile butadiene rubber.

10. The studless tire according to claim 1, wherein the non-metallic short fibers comprise carbon fibers or glass fibers.

11. The studless tire according to claim 1, wherein a proportion of non-metallic short fibers to diene rubber in the tread is about 2 to 28 parts by weight of the non-metallic short fibers to 100 parts by weight of the diene rubber.

* * * * *